Figure 1:
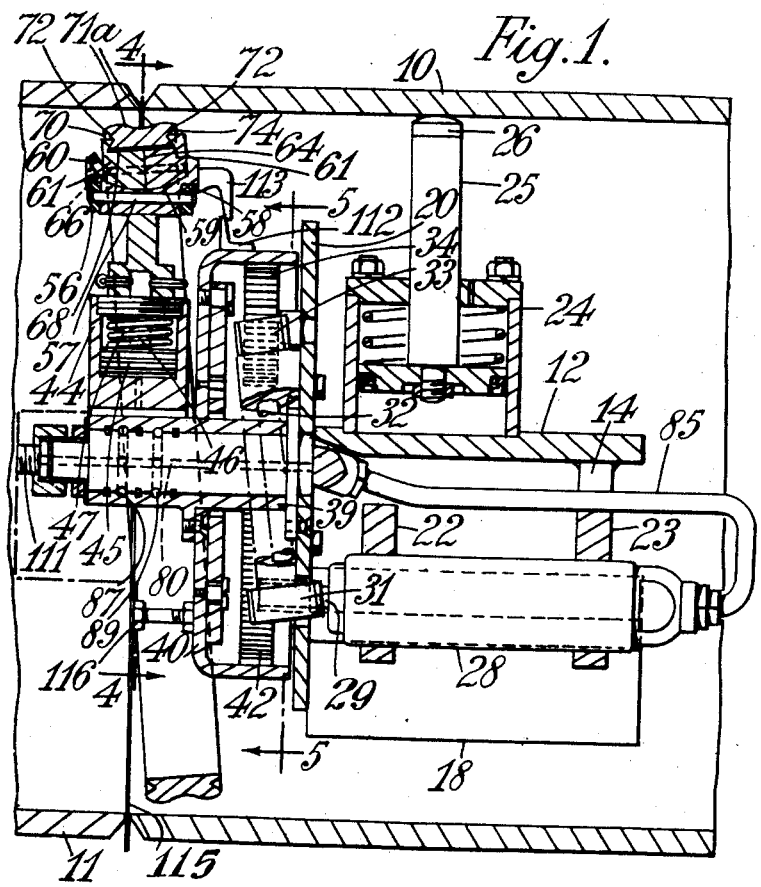

May 26, 1959　　　　J. HANDLEY　　　2,887,972
APPARATUS FOR WELDING PIPES
Filed Dec. 16, 1955　　　　　　　　　　　　　　4 Sheets-Sheet 1

INVENTOR
J. HANDLEY
ATTYS.

May 26, 1959

J. HANDLEY 2,887,972

APPARATUS FOR WELDING PIPES

Filed Dec. 16, 1955

4 Sheets-Sheet 2

INVENTOR
J. HANDLEY
By Mawhinney & Mawhinney
ATTYS.

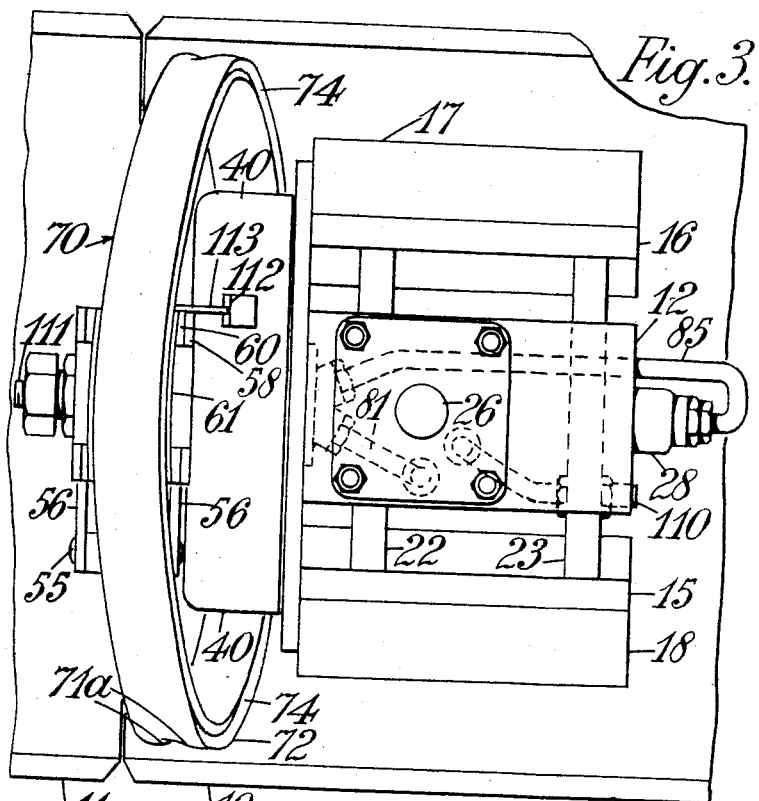
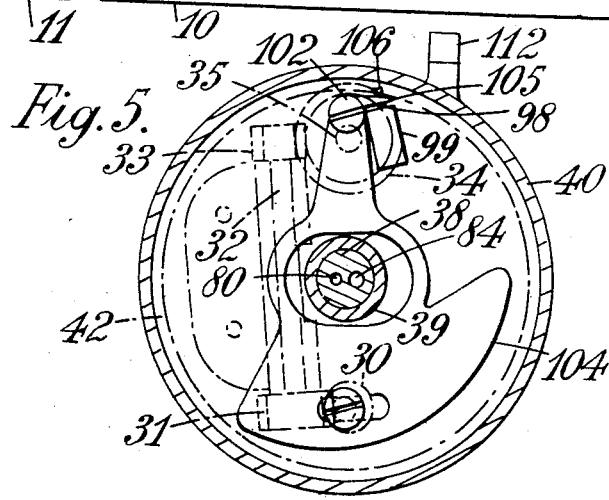

May 26, 1959

J. HANDLEY 2,887,972

APPARATUS FOR WELDING PIPES

Filed Dec. 16, 1955

4 Sheets-Sheet 4

INVENTOR

J. HANDLEY

By Mawhinney & Mawhinney

ATTYS.

United States Patent Office 2,887,972
Patented May 26, 1959

2,887,972

APPARATUS FOR WELDING PIPES

John Handley, Purley, England, assignor to Lincoln Electric Company Limited, Welwyn, Garden City, England, a British company Application December 16, 1955, Serial No. 553,772

9 Claims. (Cl. 113—59)

The invention relates to an apparatus and a method, for use in the end to end welding of pipes (e.g. in the construction of an oil pipe line) and is concerned with the welding process in which an arc or a flame (or combination thereof) is progressed around the outside of the pipes by relative rotation between the arc or flame and the pipes.

It is desirable in carrying out the above process to back up the joint, inside the pipes, opposite to the arc or flame, whether or not the ends of the pipes are chamfered to provide a V-groove around the joint. Backing up the joint has various advantages which include limitation of the penetration of the joint, and reduction of internal obstruction by the formation of unduly large beads of metal or slag.

One method of backing up the joint which has been proposed is to employ a closely fitting ring of copper within the joint. Such a ring however is unsatisfactory for various reasons. One reason is that it is difficult to remove after welding has been completed and another is that it does not allow for slight misalignment of the pipe surfaces due, for example to slight variations in size or departure from a truly circular bore. It is an object of the present invention to provide an apparatus and a method for use in backing up the joint in the end to end welding of pipes in which the first of these disadvantages and, in a preferred form of the invention both disadvantages, are reduced or overcome.

The apparatus provided by the invention comprises a backing-up ring which is constructed to fit loosely within the joint and means operable progressively for pressing the portion of the ring for the time being opposite to the arc or flame against the pipes as welding proceeds around the pipes, said means permitting the ring to be held (e.g. by friction against the pipes) from substantial circumferential movement relative to the pipes.

In one construction of the apparatus according to the invention the ring has a peripheral groove in its outer surface, the groove, which is to be opposite to the joint in use, providing clearance for limited penetration of the joint and for slag.

In the preferred form of the invention the pressing means aforesaid permit the ring to rock about the position of contact with the pipes whereby contact between the ring and both pipes may be established and maintained even if the surfaces of the pipes are out of alignment. In this form of the apparatus the side portions of the outer peripheral surface of the ring may be chamfered or curved towards the centre of the ring so that on tilting of the ring as aforesaid the point of contact with the surface of the outer of the two pipes is maintained inwardly from the side edge of the ring and the space between the ring and the pipes, which provides clearance for limited penetration and for slag, is restricted.

When the apparatus is to be used under conditions in which the pipes are rotated and the arc of flame remains stationary (e.g. over the top of the joint), the pressing means may include a pressing member which is operable to press the ring against the pipes, and there may be a motor which reacts against one of the pipes and operates to rotate the presser member in the direction contrary to the rotation of the pipes and a pendulum or like gravity operated device which controls the operation of the motor to maintain the presser member in a position in which it presses the ring against the pipes opposite to the arc or flame.

The invention also provides the method of joining by end-to-end welding two pipes by means of an arc or flame (or combination thereof), which comprises the steps of progressing the arc or flame around the outside of the joint by relative rotation between the arc or flame and the pipes, and backing up the joint by means of a ring fitting loosely within the joint and by progressively pressing the portion of the ring for the time being opposite to the arc or flame against the pipes as welding proceeds around the joint, the ring being held (e.g. by friction against the pipes) from substantial circumferential movement relative to the pipes.

The invention further provides a ring (e.g. of copper) for use as an internal backing-up member in the end-to-end welding of pipes and having its outer peripheral surface formed with a circumferential groove and with the portions at each side of the groove extending away from the groove with a curve or slope towards the centre of the ring, whereby the groove provides a space between the ring and the pipes for limited penetration through the joint of the weld material and for slag and the side portions permit rocking movement of the ring to accommodate non-alignment of the pipes with only small changes in the volume of the space.

Figure 7:
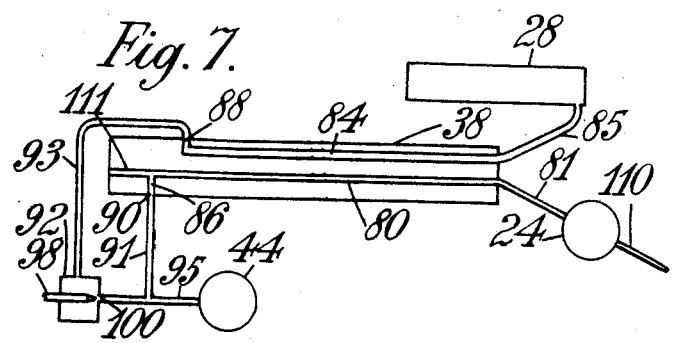
Figure 2:
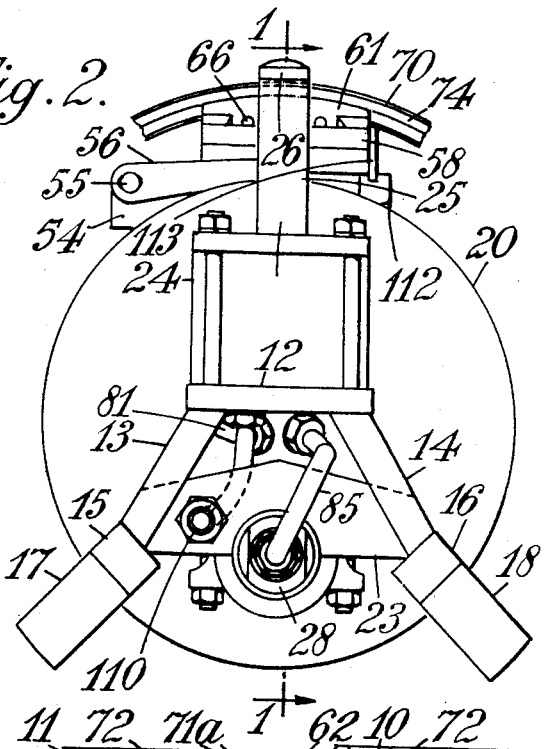
Figure 6:
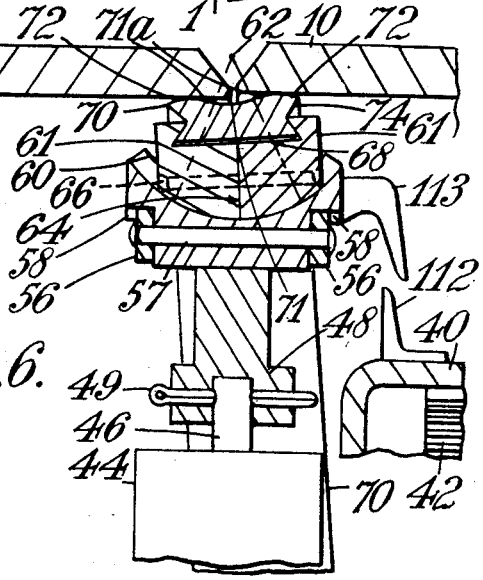
Figure 4:
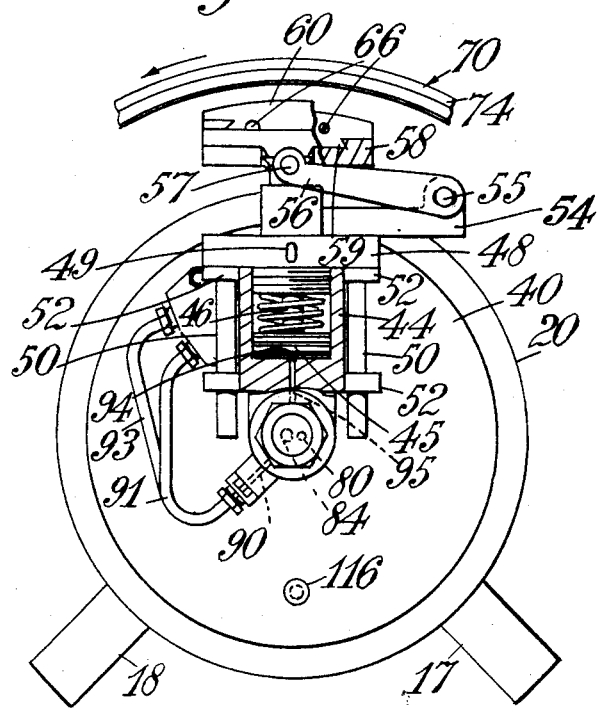

One specific construction of apparatus according to the invention will now be described by way of example of how the invention may be carried into effect and with reference to the accompanying drawings, in which:

Figure 1 is a section, on the line 1—1 in Figure 2, showing the apparatus in position for use to weld a pipe joint, before the compressed air has been turned on, Figure 2 is an end view of the apparatus, Figure 3 is a plan view of the apparatus, Figure 4 is a section on the line 4—4 in Figure 1, Figure 5 is a section on the line 5—5 in Figure 1, Figure 6 is a view corresponding to a part of Figure 1 but showing the parts in their operative position, and Figure 7 is a diagram showing the manner in which the air connections are made.

The apparatus forming the subject of this example is intended for use in the end-to-end arc welding of two pipes shown at 10 and 11, respectively, the pipes being rotated during welding to maintain the welding zone at the top of the pipes as welding progresses.

The apparatus comprises a body composed of a platform 12 having at its rear end two legs 13, 14 which are at about 120° to one another and terminate in feet 15, 16 to which shoes 17, 18 of different thicknesses may be attached to adjust the apparatus to pipes of different sizes. At the front end, the platform is welded to a disc 20, the front ends of the feet 15, 16 also being welded to the disc. A cross-bar 22 interconnects the feet and a similar cross-bar 23 interconnects the legs.

Supported on the platform 12 there is a compressed air jack 24 having a piston rod 25 which is movable along a line at 120° to each of the legs 13, 14. The end portion 26 of the piston rod is detachable and interchangeable with end portions of different lengths for the purpose of varying the length of the rod 25 to suit pipes of different diameters.

A compressed air motor 28 which is operable to rotate a spindle 29 carrying a helical gear 30 is clamped against the undersides of the cross-bars 22, 23. The spindle 29 passes through a hole in the disc 20 and the gear 30 is in front of the disc. The gear 30 meshes with a gear 31 on a shaft 32 which carries at its upper end a worm 33 which in turn engages a gear 34 rotatable on a spindle 35 on the front face of the disc 20.

Extending from the centre of the disc 20 there is a shaft 38 on which there is a rotatable sleeve 39 carrying a drum 40. The drum has an internal annular gear 42 which meshes with the gear 34.

Carried on the outer face of the drum there is a compressed air cylinder 44 which contains a piston 45 having a piston rod 46. A spring 47 urges the piston downwardly into the cylinder. A cross-head 48 is detachably secured to the end of the piston rod by means of a split pin 49. Two guide rods 50 which are secured to the cross-head, slide in guideways in lugs 52 integral with the cylinder 44 and serve to prevent rotation or tilting of the piston rod and cross-head. The cross-head is formed with an arm 54 to which there is pivoted at 55 a double lever 56. The pivoted connection 55 permits a limited amount of sideways movement of the lever, i.e., the free end of the lever has a limited freedom of movement in a direction perpendicular to the plane of the paper as seen in Figures 2 and 4. Pivoted at 57 to the free end of the lever 56 there is a block 58. The upper surfaces 59, 60 of this block are concavely curved about a centre which lies in the thickness of the pipes when the apparatus is in operation as later described and is indicated diagrammatically at 62 in Figure 6. These upper surfaces are shaped to provide a dove-tail arcuate groove and slidable within the groove there is a two-part pad 61. The pad is accordingly capable of rocking movement about the centre of curvature 62 of the surfaces 59, 60 and is retained within the groove by the dove-tailed engagement. It may, however, be removed by sliding out of either end of the groove.

The pad 61 is divisible at 64 and the two parts are held together by two screws 66. The upper surface of the pad is formed as a dove-tailed groove 68 which is arcuate about an axis which, in the normal operative position of the pad is approximately parallel to the shaft 38. The radius of the curvature corresponds to the radius of the ring about to be described and pads of different curvature may be provided for use with rings of different sizes.

Received within the groove 68 and retained therein by the dovetail is a copper backing-up ring 70. The pad is freely slidable around the ring which has its centre on the axis of curvature of the groove 68.

The ring 70 has the section shown in Figures 1 and 6 and in particular it has a shallow groove 71 in its outer circumferential surface, the sides 71a of the groove being chamfered. The edge portions 72 of the outer circumferential surface are also chamfered or curved towards the centre of the ring. The radial faces of the ring are provided with V-grooves 74 for engagement by the pad 68.

The shaft 38 is formed with a longitudinal passageway 80 which has a pipe connection 81 to the cylinder of the jack 24. There is also a passageway 84 in the shaft 38 with a pipe connection 85 to the motor 28. The passageway 80 has a side branch 86 to a circumferential groove 87 in the shaft 38 and the passageway 84 has a similar branch 88 to a circumferential groove 89 in the shaft. In the sleeve 39 there is a port 90 which registers with the groove 86 and has a pipe connection 91 to a valve 92 (later described). A connection 93 leads from the outlet of valve 92 to a further port in the sleeve 39 which registers with groove 88. The pressure cylinder 44 has a port 94 which leads through passageway 95 to a port in the sleeve registering with groove 87 and passageway 86.

The valve 92 comprises a needle 98 slidable in a block 99 (Figure 5) into and out of engagement with a seat 100. The block 99 is secured on the inside of the drum 40. Pivoted at 102 to the inner face of the drum there is a pendulum 104 which has, at its upper end, a side arm 105 with an adjustable screw 106 which is engageable with the needle 98 to push the needle to the closed position.

Sealing rings 108 are provided in the shaft 38 to reduce leakage along the shaft between the grooves 87, 89 and to the ends of the sleeve.

There is an inlet 110 to the jacking cylinder 24 which can be used as an alternative to an inlet 111 at the end of the passageway 80, the inlet not in use being blanked off.

A stop 112 is provided on the drum 40 for engagement with a cam plate 113 on the end of the pad 61 to hold the ring in the tilted position shown in Figure 1 when the crosshead is in its lowermost position, as shown. To assist this tilting action a spring may be provided which tends to hold the cross-head in its lowermost position.

The operation of the apparatus in the welding of the joint in the pipes will now be described.

A pipe connection from a source of compressed air is made to either the inlet 110 or the inlet 111 as is convenient. The apparatus is then drawn (e.g. by a cable or by a hose for the air, attached to the apparatus) along one pipe until the centre of the upper part of the ring 70 is, as shown in Figure 1, immediately beneath the joint. This position can be determined by the use of a stop or feeler, indicated at 115, inserted through the joint or by a light beam directed through the joint and the operation is facilitated by the tilted attitude of the ring. A stop 116 is provided on the apparatus for engagement with a feeler 115. When the apparatus has been properly positioned, the compressed air is turned on. The air enters directly (i.e. without control by valve 92) into the jack 24 and so moves the end 26 of the jack rod into pressure engagement with the inside of one of the pipes. The apparatus is then firmly clamped to the pipe by the end 26 and the two feet 15, 16. The air also enters directly into the presser cylinder 44. This causes the cross-head 48 to move upwardly and by engagement of the presser member or anvil 58 thereon with the pad 61, to press the ring 70 into engagement with the inside of the top of the pipes. The ring, which is slightly smaller in diameter than the pipes is free to tilt (e.g. as shown in Figure 6) to accommodate itself to any slight misalignment and to bear against both pipes. The shape of the peripheral surface of the ring assists in this and also provides space between the groove 71 and the pipes for a limited penetration of the joint by the welding material and for slag. The chamfered edges of the ring assist in reducing changes in the volume of the space just mentioned resulting from differences in the alignment of the pipes, by ensuring that contact between the ring and the outer of the pipes remains near the edge of the groove and does not occur at the edge of the ring. Further the chamfered edges of the groove ensure that on tilting of the ring as aforesaid the point of contact with the surface of the inner of the two pipes moves inwardly of the groove and change in volume of the space due to the tilting action is limited.

Rotation of the pipes and welding is then begun, the welding being effected at the top of the pipes immediately above the portion of the ring which is pressed against the pipes. The pipes are rotated in the anticlockwise direction as viewed in Figure 4, which corresponds to the clockwise direction as seen in Figure 5. As the pipes are rotated the body of the apparatus is carried around with them. The drum 40 with the cylinder 44, block 58 and pad 61 tend to travel around with the body. The pendulum 104 which hangs free from its pivot 102 to the drum does not follow the movement of the drum and accordingly the valve 92 is permitted to open. Opening of the valve admits air to the motor 28 which rotates to drive the drum (anti-clockise in Figure 5) and so to maintain the block 58 and pad 61 at the top of the pipes, beneath the welding zone. If the drum tends to rotate too fast, the pendulum shuts off the valve and the motor stops. The arrangement accordingly is that the ring 70 is held continuously in contact with the pipes beneath the welding zone and is free from engagement with the pipes elsewhere which enables the ring to adapt itself to changes in the alignment of the pipe surfaces. The ring travels around with the pipes, sliding on the pad 61.

When the joint has been completed the air is turned off which releases the apparatus for withdrawal through the end of one of the pipes.

The manner in which the body portion of the apparatus may be adapted to pipes of different sizes has already been described. The presser means may be adapted by substitution of crossheads 48 of different dimensions. Rings having diameters suited to different sizes of pipes are required and interchangeable pads 61 with grooves 68 curved to suit the different rings will also be needed.

The invention is not restricted to the constructional details of the above example. For instance the invention may be applied to the process of welding in which the pipes remain stationary and the welding arc or flame is progressed around the pipes. When so applied the compressed air motor and its associated pendulum are replaced by an electric motor which is arranged to run in synchronism with an electric motor employed to progress the arc or flame, the speed of operation of the two motors and their gearing being such that the block 58 and pad 61 are maintained opposite to the arc or flame as welding proceeds and the ring 70 is accordingly progressively pressed against the portion of the pipes being welded. Master and slave motors which will operate in synchronism and are suitable for the purpose just described are well known. It is not however essential that electric motors be used for this purpose. Pneumatic or hydraulic motors may be used. There may be a continuously running pneumatic or hydraulic motor for progressing the welding arc or flame around the pipes and intermittent means for moving the block 58 and pad 61. These intermittent means may be a pressure cylinder driving the block and pad through a pawl and ratchet device and the operating fluid may be admitted to the cylinder at appropriate intervals by means of a valve controlled by a cam driven by the continuously running motor.

It is also within the invention to provide means, which travel with the pad 61, for maintaining a shield of an inert gas such as argon around the ring at the welding zone. The gas may, for example, be emitted from nozzles in the block 58 directed against the sides of the ring at the welding zone.

It is not essential that the ring has undercut side grooves 74 for engagement by the pad 68 as above described. These grooves may be replaced by ribs which are received in recesses in the pad.

I claim:

1. Apparatus for use in backing up the joint in end-to-end welding of two pipes by means of an arc or flame applied at a welding zone which is progressed around the outside of the pipes by relative rotation between the arc or flame and the pipes, which apparatus comprises a backing-up ring constructed to fit loosely within the joint, clamping means engageable in holding relation with the interior of one of the pipes adjacent to the joint, pressing means operable to apply an outward force to said ring to press the ring into contact with the pipes at one circumferential position, means for supporting said pressing means from said clamping means for rotation about an axis extending lengthwise of the pipes, means for rotating said pressing means about said axis whereby the said one circumferential position is progressively advanced around the joint and an outward-force-transmitting connection between said pressing means and said ring operative to permit relative circumferential movement between the pressing means and the ring.

2. Apparatus according to claim 1 in which the connection aforesaid permits the ring to tilt relative to the pressing means about the position of contact with the pipes whereby contact between the ring and both pipes may be established and maintained even if the surfaces of the pipes are out of alignment.

3. Apparatus according to claim 2 in which the side portions of the outer peripheral surface of the ring slope towards the center of the ring so that on tilting of the ring as aforesaid the point of contact with the surface of the outer of the two pipes is maintained inwardly from the side edges of the ring.

4. Apparatus according to claim 2 and including means for holding the ring tilted at the connection aforesaid relative to the plane of the joint when the pressing means are inoperative whereby a portion of the joint is left uncovered by the ring to provide access through the joint for means for determining the position of the apparatus along the length of the pipes.

5. Apparatus according to claim 4 in combination with means operating through the joint for determining the correct position of the apparatus along the length of the pipes.

6. Apparatus for use in backing up the joint in end-to-end welding of two pipes by means of an arc or flame which remains stationary while the pipes are rotated around their axes which apparatus comprises a backing-up ring constructed to fit loosely within the joint, clamping means engageable in holding relation with the interior of one of the pipes adjacent to the joint, pressing means operable to apply an outward force to said ring to press the ring into contact with the pipes at one circumferential position, an outward-force-transmitting connection between said pressing means and said ring operative to permit relative circumferential movement between the pressing means and the ring, means for supporting said pressing means from said clamping means for rotation about an axis extending lengthwise of the pipes, a motor operable to rotate the pressing means about said axis in the direction contrary to the rotation of the pipes, a control for the motor, a weight, a pivotal support for the weight offset from the center of gravity thereof, means carrying the pivotal support for rotation with the presser member and an operative connection between said weight and said control whereby swinging movements of the weight about its pivotal support caused by rotation of the support cause the motor to maintain the pivotal support and the presser member in substantially constant angular positions relative to the vertical.

7. Apparatus for use in backing up the joint in end-to-end welding of two pipes by means of an arc or flame which remains stationary while the pipes are rotated around their axes which apparatus comprises a backing-up ring constructed to fit loosely within the joint, a frame, clamping means carried by the frame and extensible into holding engagement with the interior of one of the pipes, a motor carried by the frame, a carrier mounted for rotary movement on the frame, a presser member mounted on the carrier for radial movement into engagement with the ring and including a shoe making circumferential sliding contact with the interior of the ring, a pendulum mounted on the carrier, a driving connection between the motor and the carrier and control means for actuating the motor, to rotate the carrier in accordance with the attitude of the pendulum and the location of the welding zone.

8. Apparatus for use in backing up the joint in end-to-end welding of two pipes by means of an arc or flame applied at a welding zone which is progressed around the outside of the pipes by relative rotation between the arc or flame and the pipes which apparatus comprises a backing-up ring constructed to fit loosely within the joint, clamping means engageable in holding relation with the interior of one of the pipes adjacent the joint, pressing means operable to apply an outward force to said ring to press the ring into contact with the pipes at one circumferential position and having an outward-force-transmitting connection between said pressing means and said ring operative to permit relative circumferential movement between the pressing means and the ring and a motor operable to rotate the pressing means relative to the clamping means in synchronism with the relative rotation between the pipes and the welding zone to maintain the said one circumferential position at the welding zone.

9. Apparatus for use in backing up the joint in end-to-end welding of two pipes by means of an arc or flame applied at a welding zone which is progressed around the outside of the pipes by relative rotation between the arc or flame and the pipes which apparatus comprises a backing-up ring constructed to fit loosely within the joint, a frame for location within one of the pipes and having expansible clamping means to secure the frame within the pipe and a pivotal support, a carrier pivotally mounted on said support for rotation about an axis extending lengthwise of the pipes, radially extensible means on said support and having a shoe for sliding outward pressure engagement with the ring, a motor supported on the frame and having a driving connection to the carrier to effect rotation thereof, a pendulum mounted on said carrier and control means for the motor mounted on said carrier and operable by the pendulum in accordance with the position of the pendulum and the location of the welding zone.

References Cited in the file of this patent
UNITED STATES PATENTS

| | | |
|---|---|---|
| 1,806,949 | Palm | May 26, 1931 |
| 1,806,954 | Schmitz | May 26, 1931 |
| 2,408,255 | Elliott et al. | Sept. 24, 1946 |
| 2,674,217 | Rosenblatt et al. | Apr. 6, 1954 |
| 2,691,952 | Wilson et al. | Oct. 19, 1954 |
| 2,741,206 | Stevenson | Apr. 10, 1956 |
| 2,768,281 | McDaniel | Oct. 23, 1956 |